Nov. 24, 1925.

A. D. BROCHU 1,562,615

BUSHING CONTRACTING DEVICE

Filed Sept. 17, 1924

Inventor
Aimée D. Brochu his Attorney

Patented Nov. 24, 1925.

1,562,615

UNITED STATES PATENT OFFICE.

AIMÉE D. BROCHU, OF HARTFORD, CONNECTICUT.

BUSHING-CONTRACTING DEVICE.

Application filed September 17, 1924. Serial No. 738,221.

*To all whom it may concern:*

Be it known that I, AIMÉE D. BROCHU, a subject of Great Britain, and a resident of Hartford, county of Hartford, State of Connecticut, have invented certain new and useful Improvements in a Bushing-Contracting Device, of which the following is a specification.

The present invention relates to a sleeve or bushing contracting device and has as its object to provide a device of this sort having various features of novelty and advantage.

More specifically, the aim of the invention is to provide a device which is very simple in construction, inexpensive in manufacture, and effective in operation.

A further aim of the invention is to provide a contracting device which may be utilized for quickly inserting split bushings or sleeves into their cooperative bores.

Other objects will be in part obvious and in part pointed out more in detail hereinafter.

The invention accordingly consists in the features of construction, combination of elements and arrangement of parts which will be exemplified in the construction hereinafter set forth, and the scope of the application of which will be indicated in the appended claims.

As an instance of a use to which my improved device may be applied, reference may be had to the insertion of a contractible bearing bushing or sleeve into its support, such as an axle housing of a Ford automobile. While my device is particularly adapted to such use and is so illustrated in the accompanying drawing, it is to be understood that the present showing is by way of exemplification only.

Figure 1:
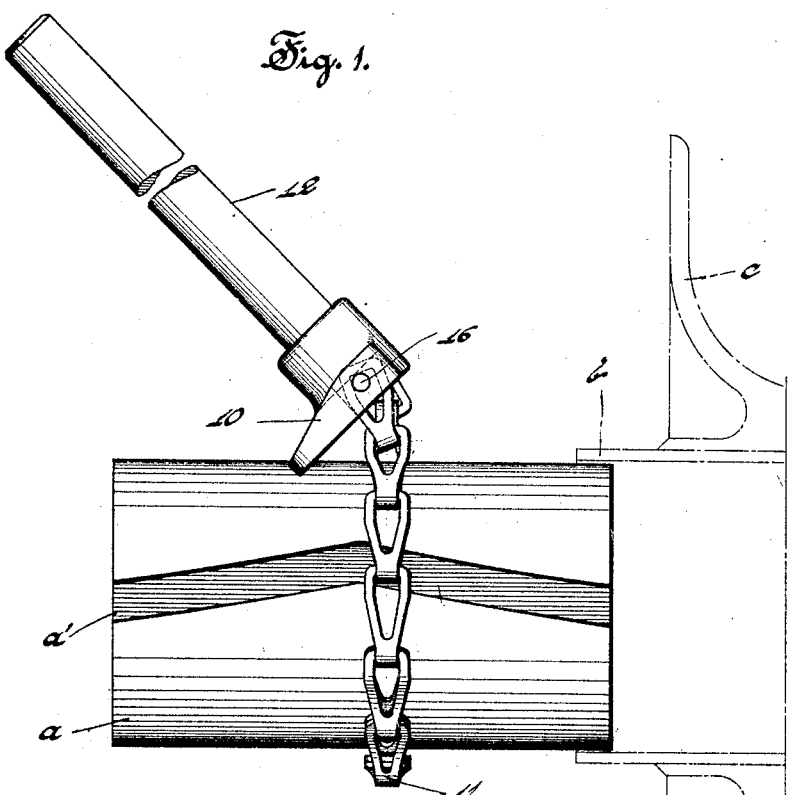
Figure 2:
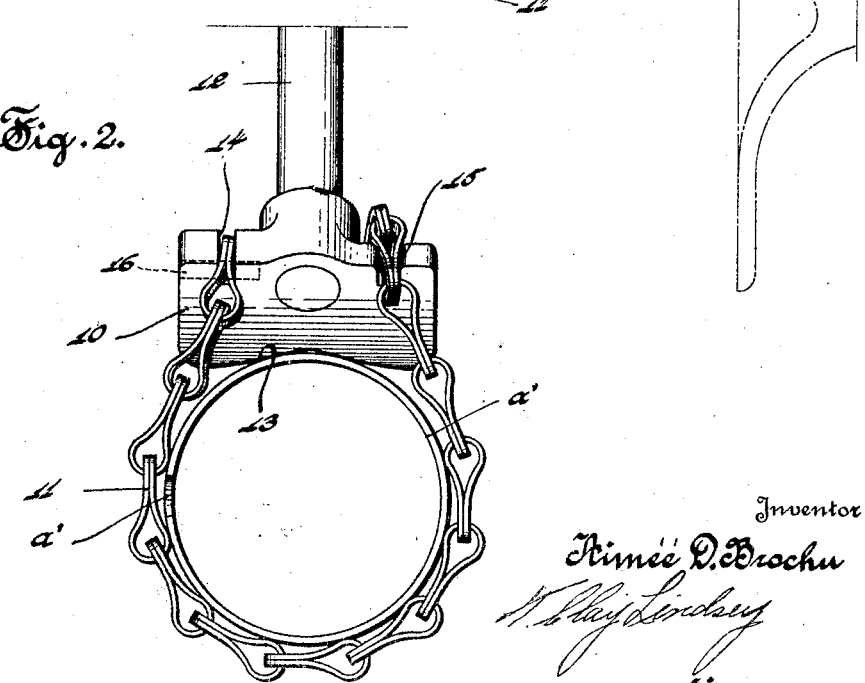

In the accompanying drawing:

Figure 1 is a side view of the device showing the manner in which it is applied to a bushing; and Fig. 2 is an end view of what is shown in Fig. 1.

Referring to the drawings more in detail, *a* denotes a bearing bushing and *b* denotes the end of a housing for the live axle of an automobile. *c* is the usual flange secured to the housing. The sleeve *a* is longitudinally split as at *a'* so that it may be contracted to facilitate its insertion into, and removal from, the housing. This sleeve is adapted to receive the roller bearings (not shown) which support the live axle (also not shown) in a manner well understood.

Referring now to my improved contracting device, 10 designates a member or head to which is connected a band or chain 11 adapted to pass around the bushing or other cylindrical member to be contracted. The head 10 is provided with a handle 12 by means of which the head is caused to bear down against the bushing, and the chain is drawn closely around the bushing as hereinafter described more in detail. The head 10, which, in use, extends transversely across the bushing, has one edge slightly recessed or curved as at 13 to prevent movement of the head transversely of the bushing during the contracting operation. The opposite or outer edge of the head is provided, to the respective sides of the handle, with notches 14 and 15. One end of the chain 11 is secured in the notch 14 by a pin 16, and the other notch 15 is adapted to selectively receive the links of the chain, depending on the size of the pipe or bushing to be contracted. In the present instance, each link of the chain is provided with a loop portion and a relatively flat portion through which the loop of the next link is threaded. The width of the notch 15 is such as to receive the flat portions of the links and to prevent the loop or wide portions from slipping through the notch.

The device is employed in the following manner: The head is placed transversely of the bushing, the chain is passed about the bushing, and that link of the chain is inserted into the notch 15 which will result in the head being angularly inclined with respect to the axis of the bushing. The handle is then swung towards the bushing so that the head 10 will be turned about its edge 13. Owing to the leverage thus exerted, the chain will be drawn tightly around the bushing thereby contracting the same. While the bushing is held in this condition, one end may be inserted into the end of the housing. After the bushing has been partly inserted into the housing, pressure on the handle may be relieved and the chain may be slipped towards the outer end of the bushing. Pressure may then again be applied to the handle to contract the bushing and then the bushing may be moved still further into the housing, and so on until the bushing is in final position.

It will be noted that my improved device 1,562,615 is very simple in construction. It comprises but relatively few parts each of which may be manufactured at a relatively low cost, and these parts may be readily assembled together. The device may be very quickly applied to the bushing to be contracted, it being merely necessary to position the head on the bushing, pass the chain about the bushing, and insert the proper link in the notch 15. In use, but a relatively small amount of power is necessary to contract the bushing because of the large effective leverage obtained. The chain may be moved to successive positions on the bushing in very short order.

As many changes could be made in the above construction and many apparently widely different embodiments of this invention could be made without departing from the scope thereof, it is intended that all matter contained in the above description or shown in the accompanying drawing shall be interpreted as illustrative and not in a limiting sense.

It is also to be understood that the language used in the following claims is intended to cover all of the generic and specific features of the invention herein described and all statements of the scope of the invention which, as a matter of language, might be said to fall therebetween.

I claim as my invention:

1. A bushing contracting device, comprising a handle, a head extending from one side of the lower end of the handle and projecting beyond the adjacent sides thereof, the lower end of said head adapted to bear transversely across a split bushing and serve as a fulcrum for raising and lowering the head on the bushing, and an encircling chain to embrace the bushing and having its ends secured to the projecting portions of the head at the upper end thereof and at opposite sides of the handle.

2. A bushing contracting device, comprising a broad head adapted to engage across a split bushing, a handle on the head for rocking the same in the plane of the axis of the bushing, and an encircling member adapted to be looped about the opposite side of the bushing and having its ends anchored to the upper part of the head to contract the encircling member when the head is rocked outwardly on the bushing.

3. A bushing contracting device, comprising an encircling member for positioning about a split bushing, a rocking member connected to the opposite ends of the encircling member and having a part extending inwardly and laterally thereof and adapted to seat against the side of the bushing, and a handle connected to the rocking member for swinging the same in a plane at right angles to the plane of the encircling member and drawing the latter toward an overlapping position with the rocking member.

4. A bushing contracting device, comprising a head adapted to seat at its inner end against the side of a split bushing, an encircling member adapted to fit about the bushing, means for adjustably connecting the encircling member to the outer end of the head to hold the head canted toward the plane of the encircling member, and a handle on the head for rocking the same toward a parallel position relatively to said plane to contract the encircling member on the bushing.

AIMÉE D. BROCHU.